(12) United States Patent
Lacroix et al.

(10) Patent No.: US 6,412,828 B1
(45) Date of Patent: Jul. 2, 2002

(54) QUICK SAFETY CONNECTION FOR REMOVABLY JOINING PIPES

(75) Inventors: Jean-Jacques Lacroix, Lovagny; Antoine Chambaud, Giez, both of (FR)

(73) Assignee: Staubli Faverges, Faverges (FR)

(*) Notice: Subject to any disclaimer, the term of this patent is extended or adjusted under 35 U.S.C. 154(b) by 0 days.

(21) Appl. No.: 09/441,292

(22) Filed: Nov. 16, 1999

(30) Foreign Application Priority Data

Dec. 3, 1998 (FR) .......................................... 98 15455

(51) Int. Cl.$^7$ .............................................. F16L 37/18
(52) U.S. Cl. ............................ 285/316; 285/1; 285/86; 285/306; 285/924; 285/900
(58) Field of Search ................................ 285/316, 306, 285/924, 900, 86, 1

(56) References Cited

U.S. PATENT DOCUMENTS

| | | | | |
|---|---|---|---|---|
| 2,279,146 A | * | 4/1942 | Schneller | |
| 2,377,812 A | * | 6/1945 | Scheiwer | |
| RE27,364 E | * | 5/1972 | German | 285/1 |
| 4,114,853 A | * | 9/1978 | Medvick | 251/149.6 |
| 4,148,459 A | * | 4/1979 | Martinez | 251/149.6 |
| 4,366,945 A | * | 1/1983 | Blauenstein | 251/149.6 |
| 4,865,292 A | * | 9/1989 | Ekman | 251/149.6 |
| 4,982,761 A | * | 1/1991 | Kreczko et al. | 137/614.03 |
| 5,445,358 A | * | 8/1995 | Anderson | 251/149.6 |
| 5,630,570 A | * | 5/1997 | Lacroix et al. | 251/149.6 |
| 5,788,290 A | * | 8/1998 | Meisinger | 285/316 |
| 5,806,832 A | | 9/1998 | Larbuisson | |
| 5,873,386 A | * | 2/1999 | Arosio | 137/614.02 |
| 6,095,570 A | * | 8/2000 | Hagen et al. | 285/93 |

FOREIGN PATENT DOCUMENTS

| | | | |
|---|---|---|---|
| GB | 544744 | * | 4/1942 |
| WO | WO9409304 | | 4/1994 |
| WO | WO9715779 | | 5/1997 |

* cited by examiner

*Primary Examiner*—Kathy Matecki
*Assistant Examiner*—Carlos Lugo
(74) *Attorney, Agent, or Firm*—Dowell & Dowell, P.C.

(57) ABSTRACT

A quick safety connection for the removable joining of pipes, comprising a male connector and a female element adapted to fit and to be locked inside one another. A controlled locking mechanism is adapted to immobilized the male connector axially in a position of connection, while at least one retention member is provided to immobilize the male connector, after release of the connector by said locking mechanism, in an intermediate position of discharge of the pipe connection. The locking mechanism and retention member are controlled by a sleeve sliding around the female element. Vents and safety stops are provided to limit the movement of the sleeve under the effect of the pressure prevailing due to the discharge of the connection in the intermediate position between the female element and the sleeve.

11 Claims, 10 Drawing Sheets

QUICK SAFETY CONNECTION FOR REMOVABLY JOINING PIPES

BACKGROUND OF THE INVENTION

The present invention relates to a quick safety connection for the removable joining of pipes and, more specifically, to a so-called "double-release" quick connection.

DESCRIPTION OF THE RELATED ART

European Patent Application 0 722 063 discloses a double-release quick connection in which two rings are used, provided with elastic claw elements adapted to cooperate successively with an outer groove of a male connector in order to release this connector in two steps, allowing the discharge of the fluid contained in the downstream pipe, which avoids the whiplash movements which might prove dangerous for a user with a single-release connection. Other double-release connections are known for example from U.S. Pat. No. 5,290,009 or DE-A-27 41 512.

In these known devices, an outer ring or sleeve is used for controlling, on the one hand, means for locking the male connector in the female element in a position of communication of the pipes, and, on the other hand, members for retaining the connector in intermediate position of emptying or discharge of the downstream pipe. In this position of discharge, the fluid which flows from the male connector fills the inner volume of the sleeve, which has the effect of increasing the pressure prevailing in an annular chamber defined around the body of the female element and inside this sleeve. Such increase in pressure may, in at least certain configurations, induce a displacement of the sleeve corresponding to an increase in the volume of this chamber, i.e. to a reduction of this pressure. Such a displacement may have the consequence of releasing the male connector without the intervention of an operator, which may result in a violent discharge and a potentially dangerous "whiplash".

It is a particular object of the present invention to overcome these drawbacks by proposing a quick safety connection in which the male connector does not risk passing automatically, i.e. without the intervention of the operator, from its position of locking in the female element to a position of complete disconnection, without retention in its position of discharge of the downstream pipe.

SUMMARY OF THE INVENTION

To that end, the invention relates to a quick connection of the type mentioned hereinbefore, which comprises means for limiting the movement of the sleeve, under the effect of the pressure prevailing in its inner volume due to the discharge of the pipe in the intermediate position, towards a position of release of the connector by the retention member.

Thanks to these means for limiting the movement of the sleeve, the latter cannot be displaced towards a position of release, premature and automatic, of the male connector.

According to a first advantageous embodiment of the invention, the means for limiting the movement of the sleeve comprise venting orifices allowing the flow of the fluid issuing from the downstream pipe, from the inner volume of the sleeve towards the outside of the connection. These vents avoid too great a rise in pressure within the sleeve, particularly in an annular chamber defined around the body of the female element. Such a pressure is therefore not capable of inducing an untimely displacement of the sleeve. The venting orifices advantageously present a total cross-section allowing the flow of the fluid issuing from this downstream pipe without substantial rise in the pressure in the inner volume of the sleeve.

According to a second, particularly advantageous embodiment of the invention, the means for limiting the movement of the sleeve comprise a stop adapted to cooperate with an inner heel of the sleeve, this stop being disposed in the inner volume of the sleeve. Such a stop makes it possible efficiently to limit the movements of the sleeve. According to an advantageous aspect, the stop is formed by a ring disposed around the body of the female element in an annular chamber defined between the body and the sleeve. This ring may be provided to be elastically loaded in the direction of an outer bearing surface of the body and in the direction of the heel of the sleeve. In that case, the means for elastically loading the ring may be formed by means for elastic return of the sleeve into position of engagement of the locking mechanism and/or of the retention member.

According to another advantageous aspect of the invention, the clearance between the body of the female element and the sleeve, downstream of the stop in the direction of flow of the fluid, in the intermediate position of the connector, is greater than the clearance between this stop and the body and/or than the clearance between this stop and this sleeve. This aspect of the invention guarantees that the pressure downstream of the stop is permanently lower than the pressure upstream of this stop, with the result that the stop is permanently subjected to a difference in pressure which tends to apply it towards the bearing surface defined on the body and towards the heel of the sleeve.

The known devices comprise means for locking in transfer position and means for retention in intermediate position, adapted to cooperate with a particular geometry of connector, particularly in the case of using elastic claws. Now, the connectors that may be used with the female elements may have several origins and variable geometries, with the result that the locking means and/or the manoeuvring members are not always fully efficient. In order to overcome this drawback, the retention member is formed by a ball capable of axial and radial movements in an oblong slot formed in the body. Furthermore, the locking mechanism may comprise needles mobile in oblong slots formed in the body in directions inclined with respect to the direction of introduction and of extraction of the male connector in and from the female element.

BRIEF DESCRIPTION OF THE DRAWINGS

The invention will be more readily understood on reading the following description of an embodiment of a quick safety connection in accordance with its principle, given solely by way of example and made with reference to the accompanying drawings, in which.

DESCRIPTION OF PREFERRED EMBODIMENTS

Figure 1:
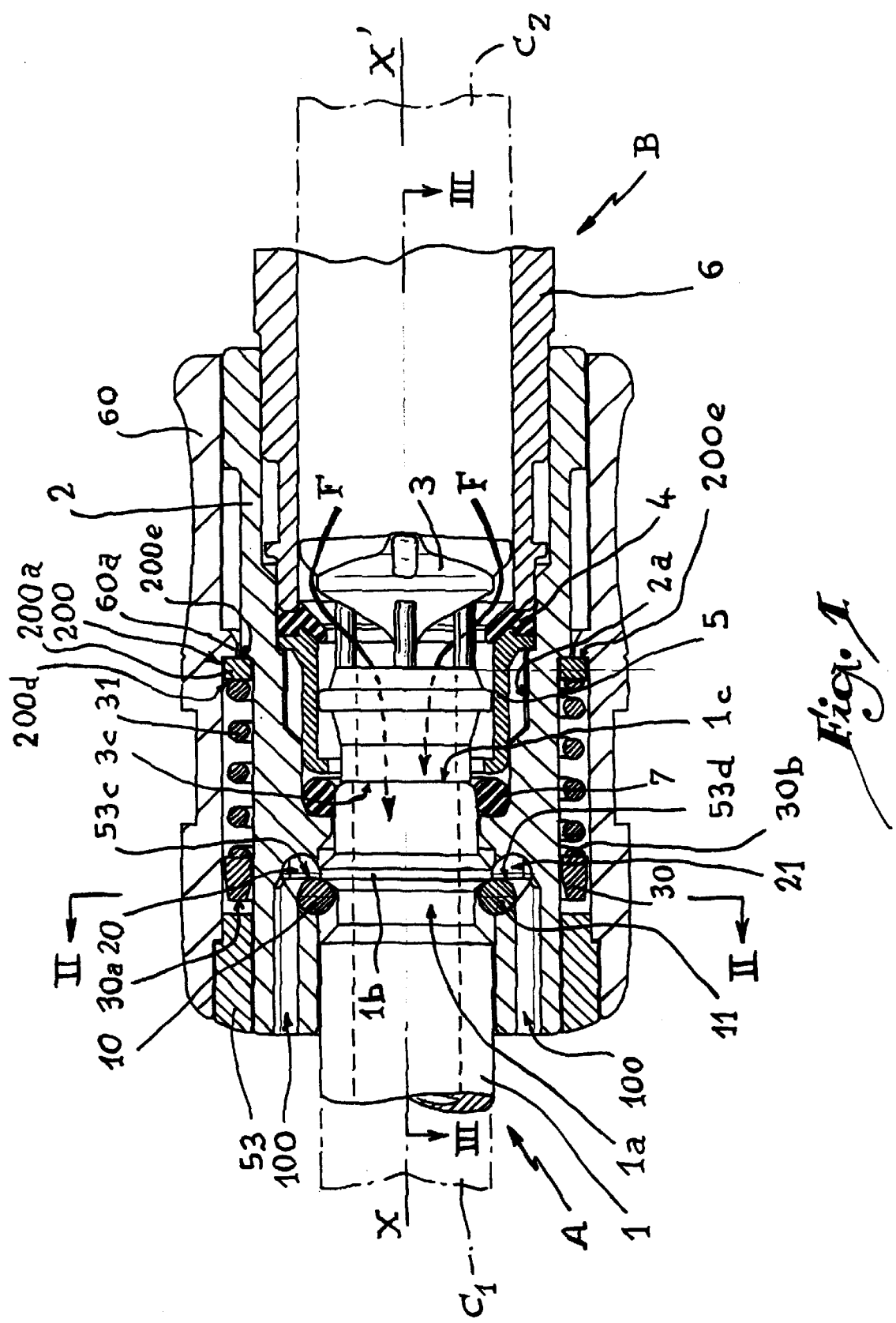
FIG. 1 is an axial section showing the general arrangement of two male and female elements of a connection according to the invention, in coupled position.

Referring now to the drawings, the quick connection shown in the Figures comprises a male element A and a female element B both provided to be tubular in shape. The male element A is formed by a connector 1 whose rear part (not shown) is fluidically connected to a first pipe $C_1$. Similarly, the rear part of the female element B is connected to a second pipe $C_2$ itself connected to a source of compressed air (not shown). The female element B is formed by a tubular body 2 inside which is slidably housed a valve 3 adapted to come into abutment against a seat 4, formed by an elastomer ring immobilized between an inner bush 5 and an outer bush 6 on which the pipe $C_2$ is connected, bushes 5 and 6 being disposed inside a central bore 2a of the body 2. An O-ring 7 is also provided in this central bore in order to abut against the outer radial surface of the connector 1 when the connection is in coupled position, as shown in FIGS. 1 and 3.

Figure 3:
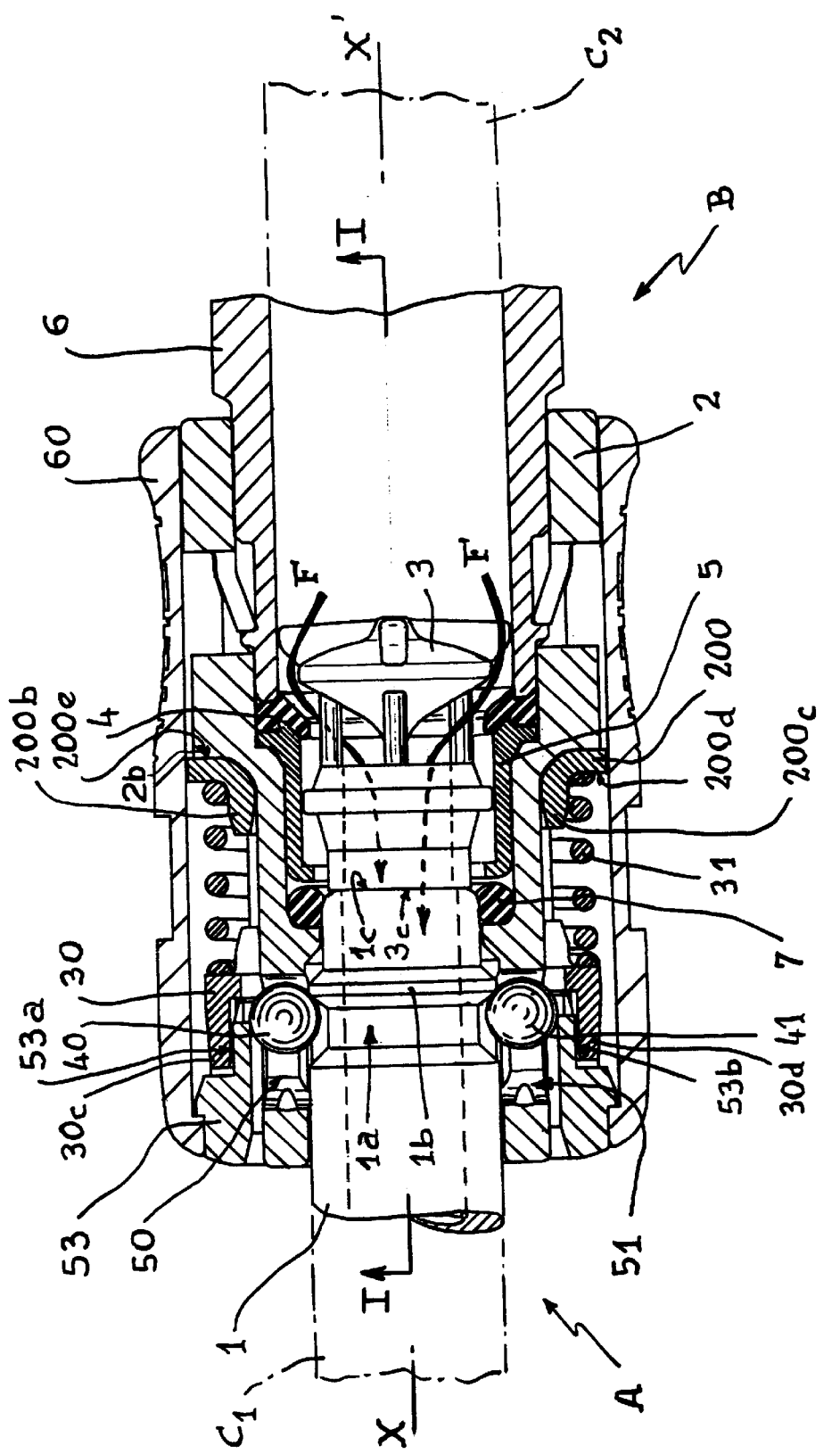
FIG. 3 is an axial section along line III—III of FIG. 1; I—I therein indicates the plane of section of FIG. 1.

Two needles 10 and 11 are provided to lock the connector 1 inside the body 2 in the position of FIGS. 1 and 3. These needles are received in an outer peripheral groove 1 a of the connector 1, bordered by an outer peripheral flange 1b. The needles 10 and 11 are mobile inside oblong slots 20 and 21 made in the body 2 and inclined with respect to the central axis X–X' of the male and female elements A and B which defines the direction of introduction and of extraction of the male connector A in and from the female element B.

During introduction of the connection 1 in the body 2, the flange 1b pushes the needles 10 and 11 inside the slots 20 and 21 until the front face 1c of the connector 1 abuts against the corresponding face 3c of the valve 3. Due to the continuing movement of introduction of the connector 1, the valve is detached from its seat 4, which allows the flow of the air traversing the connector, from the upstream pipe $C_2$ towards the downstream pipe $C_1$, as represented by arrows F in FIGS. 1 and 3.

A locking ring 30 is disposed around the body 2 and shaped so that the ends of the needles 10 and 11 are in simple abutment against a face 30a of the ring 30 facing the opening of the bore 2a of the body 2, i.e. in the direction of pipe $C_1$, in the position of FIGS. 1 and 3. By its face 30b opposite face 30a, the locking ring 30 is in abutment against a compression spring 31 which tends to push it towards the opening of the bore 2a.

In this way, when the connector 1 is introduced in the body 2, the needles 10 and 11 are firstly pushed inside the housings 20 and 21, so that they move the ring 30 in the direction of the valve 3, against the force of the spring 31. As soon as the flange 1b has passed beyond the needles 10 and 11, the elastic return effort due to the spring 31 pushes the ring 30 towards the opening of the bore 2a so that the needles 10 and 11 are also pushed in this direction and, taking into account the inclined nature of the slots 20 and 21, the needles 10 and 11 are displaced in the direction of the groove 1a of the connector 1. The connector 1 is thus locked in the body 2 in the position of FIGS. 1 and 3.

Figure 2:
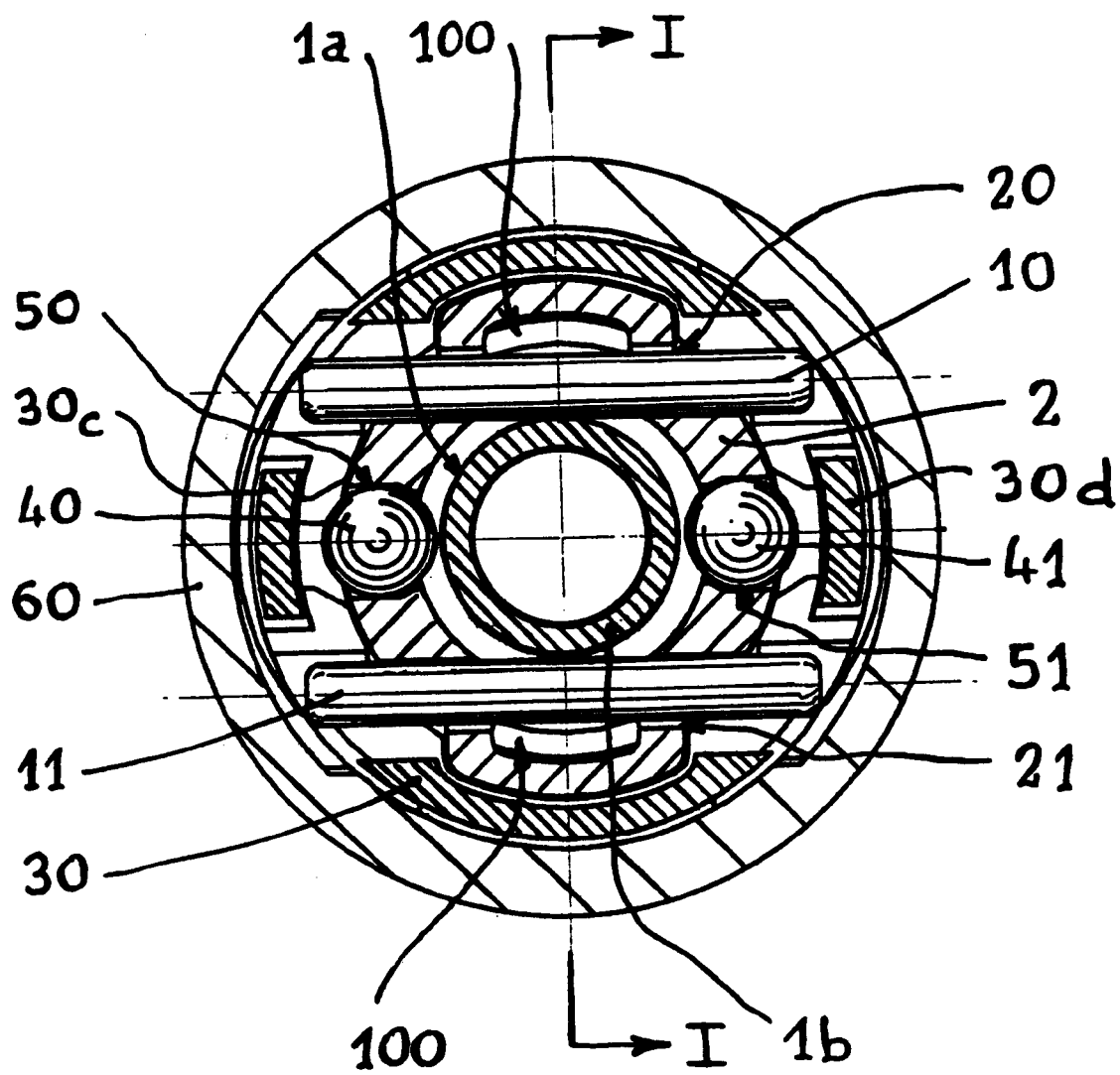
FIG. 2 is a cross-section along line II—II of FIG. 1; I—I therein indicates the plane of section of FIG. 1.

Balls 40 and 41 are housed in two oblong slots 50 and 51 made in the body 2, parallel to axis X–X'. In the position of FIGS. 1 to 3, the balls 40 and 41 are maintained engaged in the groove 1a thanks to two bearing portions 53a and 53b formed on a locking ring 53 whose function is detailed hereinafter. At the level of the balls 40 and 41, i.e. in the plane of section of FIG. 3, the ring 30 extends in two tongues 30c and 30d which cover the bearing portions 53a and 53b, with the result that a movement of the balls 40 and 41 in a radial outward direction is prevented, the balls 40 and 41 thus being firmly maintained in position in the groove 1a.

A sleeve 60 is arranged around the body 2, capable of movements of translation around this body, parallel to axis X–X'.

Figure 5:
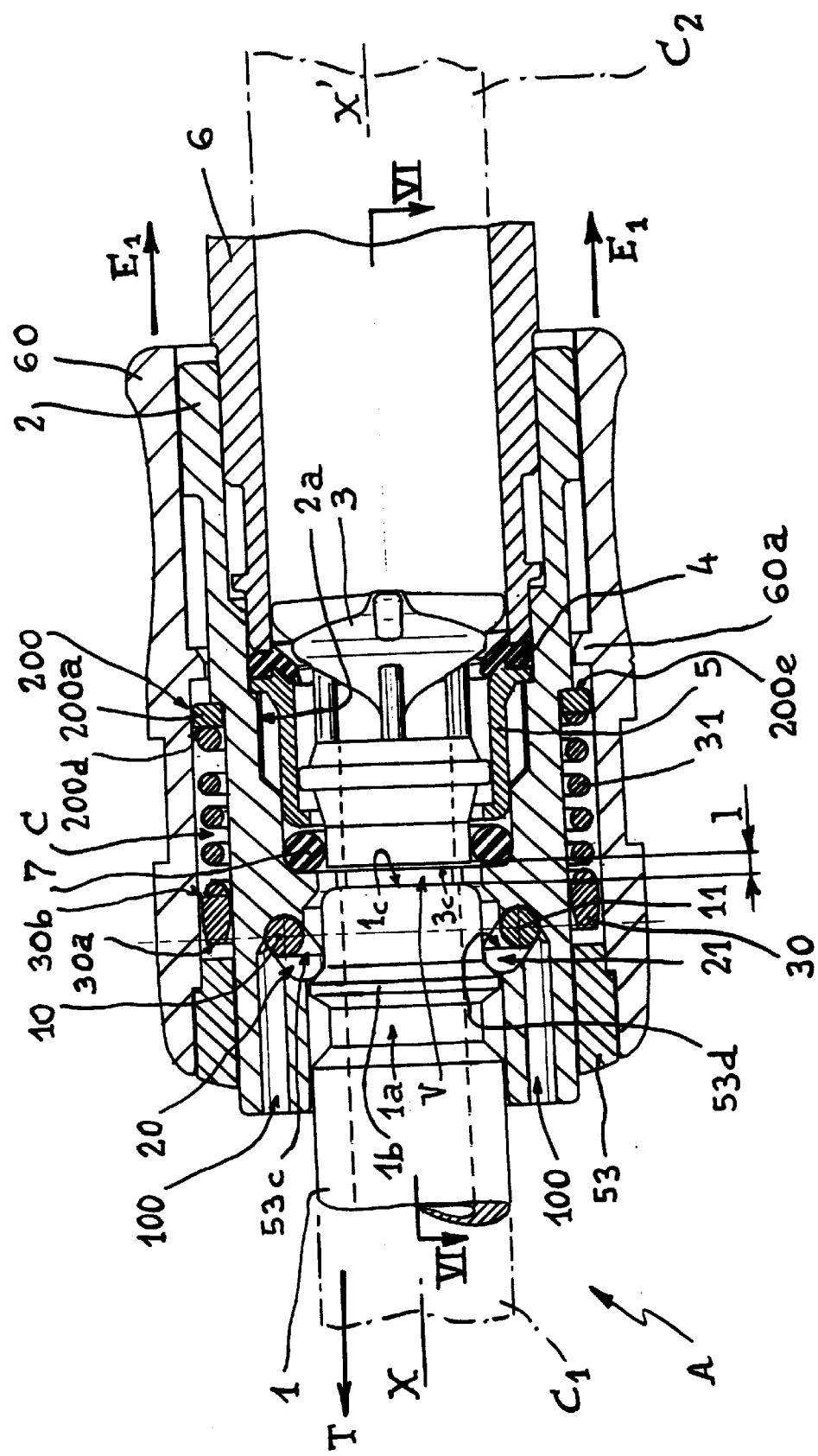
FIG. 5 is a section similar to FIG. 1 when the male connector is placed in an intermediate position of discharge or of emptying.
Figure 6:
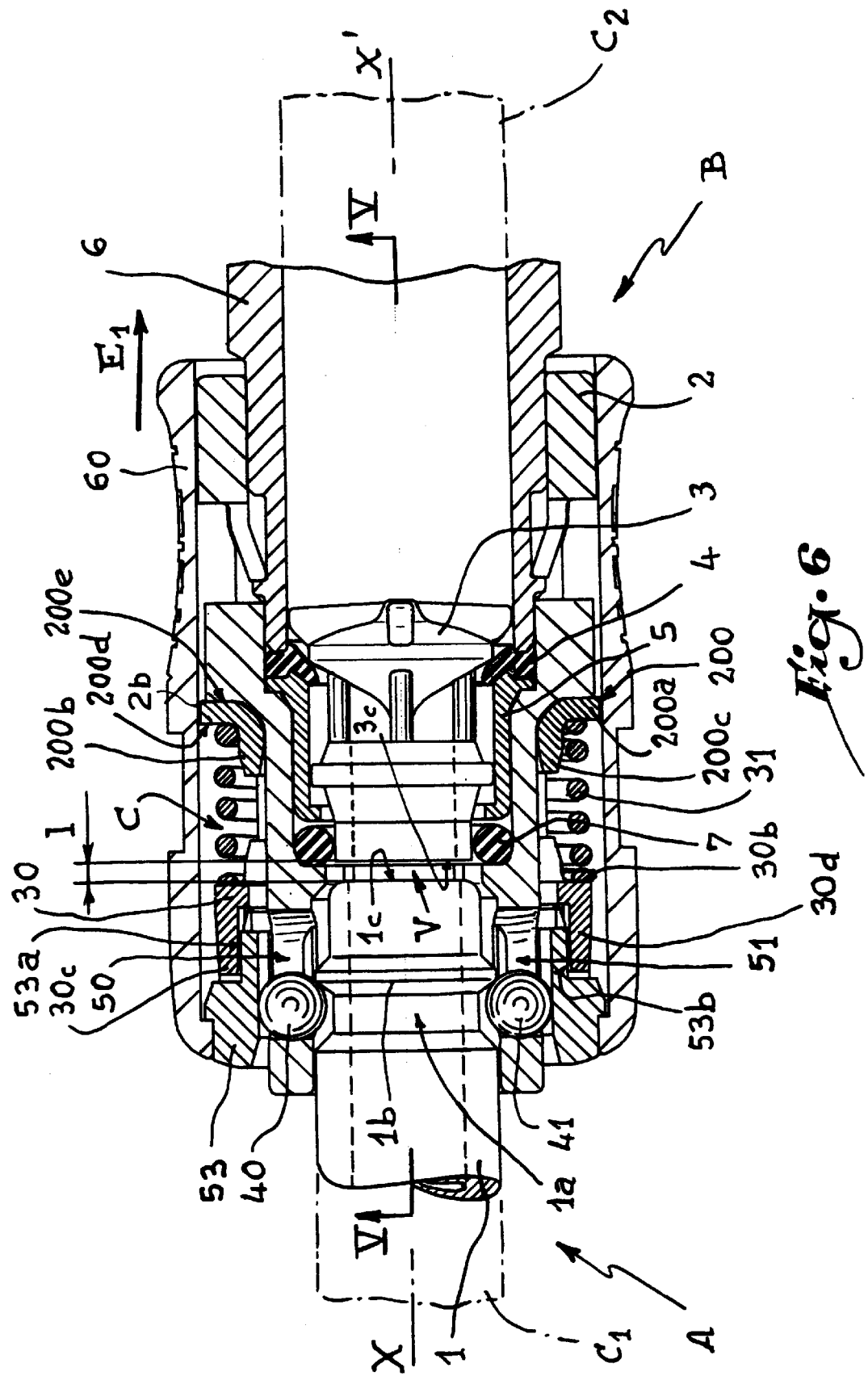
FIG. 6 is a section along line VI—VI of FIG. 5; V—V therein indicates the plane of section of FIG. 5.

When it is necessary to open the connection, i.e. to separate the male and female elements A and B, the connector 1 is unlocked from the body 2 by exerting on the sleeve 60 an effort $E_1$ directed towards the rear of the female element B, i.e. towards pipe $C_2$, as shown in FIGS. 5 and 6. The sleeve 60 is fast with the ring 53, so that the displacement of the sleeve 60 towards the pipe $C_2$ results in a concomitant displacement of the ring 53. The bearing portions 53a and 53b cover the balls 40 and 41 and prevent any radial movement of these balls towards the outside of the groove 1a.

Sidewalls 53c and 53d of the ring 53 are in simple abutment against the needles 10 and 11. Due to the movement of the ring 53, the sidewalls push the needles in the direction of pipe $C_2$, which also has the effect of pushing the ring 30 against the return force of the spring 31, as is produced during the step of unlocking of the connection. Under these conditions, due to the inclination of the slots 20 and 21 with respect to axis X–X', the needles 10 and 11 are extracted from the groove 1a of the connector 1, with the result that the connector 1 may be driven or drawn towards the outside of the bore 2a, as represented by arrow T in FIGS. 5 and 6.

The front face 1c of the connector 1 is then no longer in abutment against the face 3c of the valve 3. The valve 3 is therefore applied against the seat 4 under the effect of the pressure forces prevailing in the outer bush 6.

In the position of FIGS. 5 and 6, the connector 1 is retained inside the body 1 by the balls 40 and 41 which are maintained in the groove 1a, as shown in FIG. 6.

By passing from the position of FIGS. 1 to 3 to that of FIGS. 5 and 6, the connector 1 has arrived in a position of decompression or emptying of the air contained in the pipe $C_1$, since the front face 1c of the connector 1 is separated from the valve 3 by an inner volume V whose width 1, defined between faces 1c and 3c, is non zero.

Figure 7:
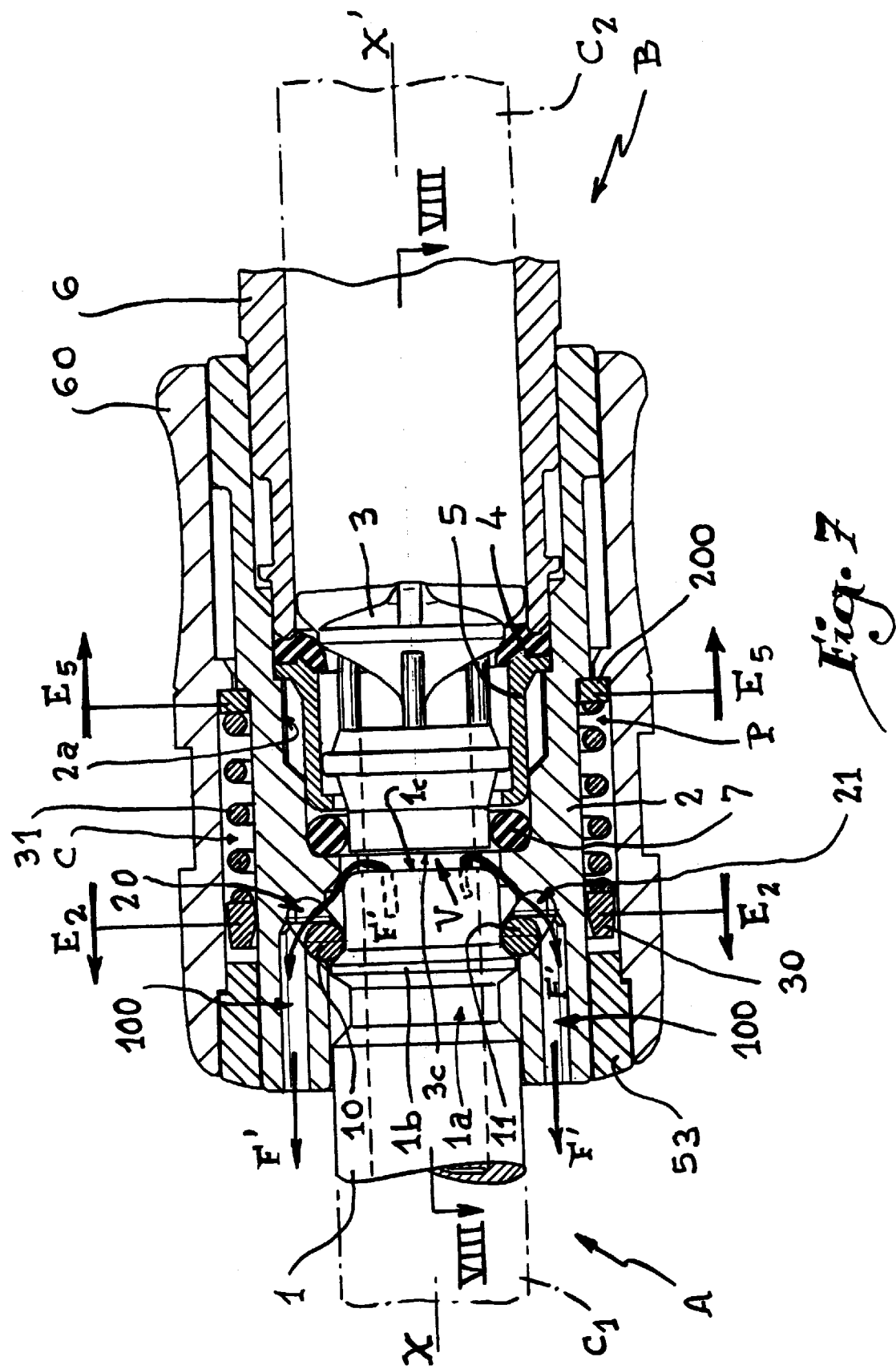
FIG. 7 is a section similar to FIG. 5 when the male connector has attained its position of discharge or of emptying.
Figure 8:
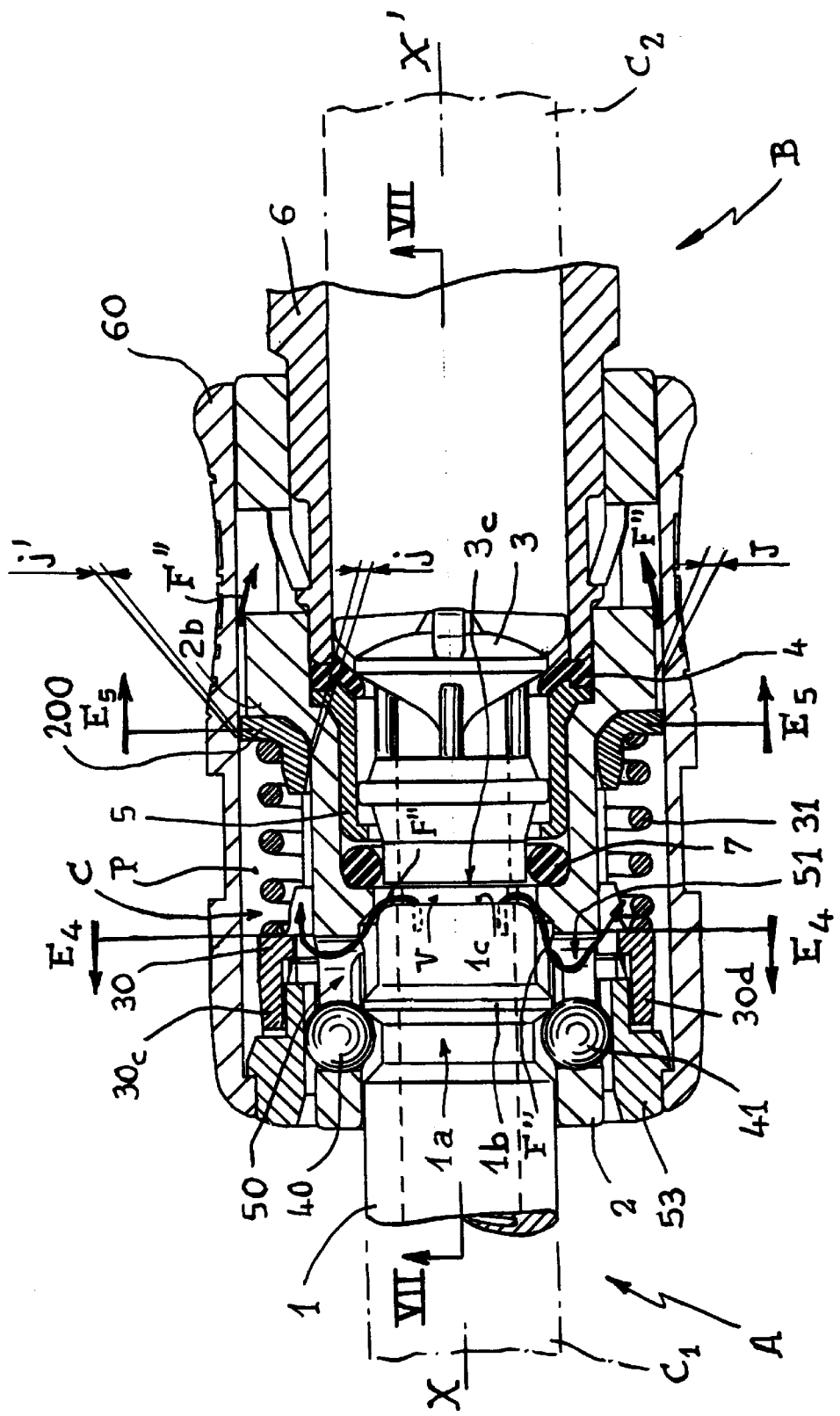
FIG. 8 is a section along line VIII—VIII of FIG. 7; VII—VII therein indicates the plane of section of FIG. 7.

When the operator releases the sleeve 60, the latter is pushed towards the opening of the bore 2a. In effect, the spring 31 exerts on the ring 30 an effort $E_2$ directed towards the pipe $C_1$ as shown in FIGS. 7 and 8. The needles 10 and 11, which are in abutment against the ring 30, are pushed towards the opening of the bore and take a position of abutment against the flange 1b shown in FIG. 7. In this position, the needles 10 and 11 exert on the sidewalls 53c and 53d of the ring 53 an effort substantially similar to effort $E_2$, which has the effect of also pushing this ring 53 and the sleeve 60 which is fast therewith in the direction of pipe $C_1$. The position of FIGS. 7 and 8 is then attained, in which the balls 40 and 41 are maintained in position in the groove 1a, as shown in FIG. 8.

In the positions of FIGS. 5 to 8, the air located in the pipe $C_1$ may flow from the connector 1 into the volume V, which makes it possible to drain the pipe $C_1$ and subsequently to avoid any risk of whiplash when the male and female elements A and B are effectively separated.

From volume V, the air fills the internal interstices of the female element B and, in particular, an annular chamber C defined in the inner volume of the sleeve 60 around the body 2. On the pipe $C_1$ side, the annular chamber C is obturated by the ring 53. Due to the flow of the air under pressure from the volume V towards the chamber C, the pressure P in the annular chamber C tends to increase.

Figure 9:
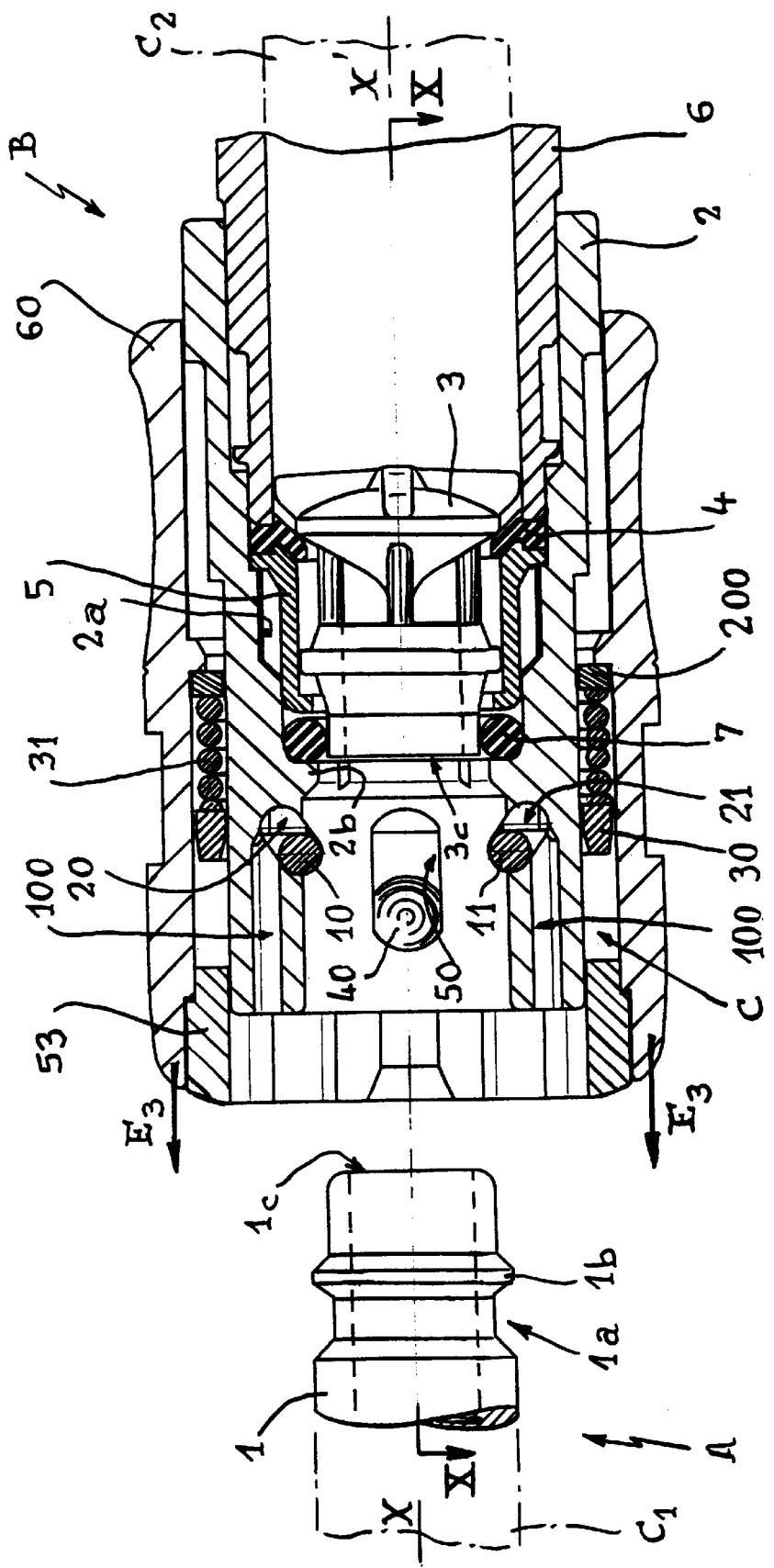
FIG. 9 is a view similar to FIG. 7 upon disconnection of the male connector from the female element of the connection.
Figure 10:
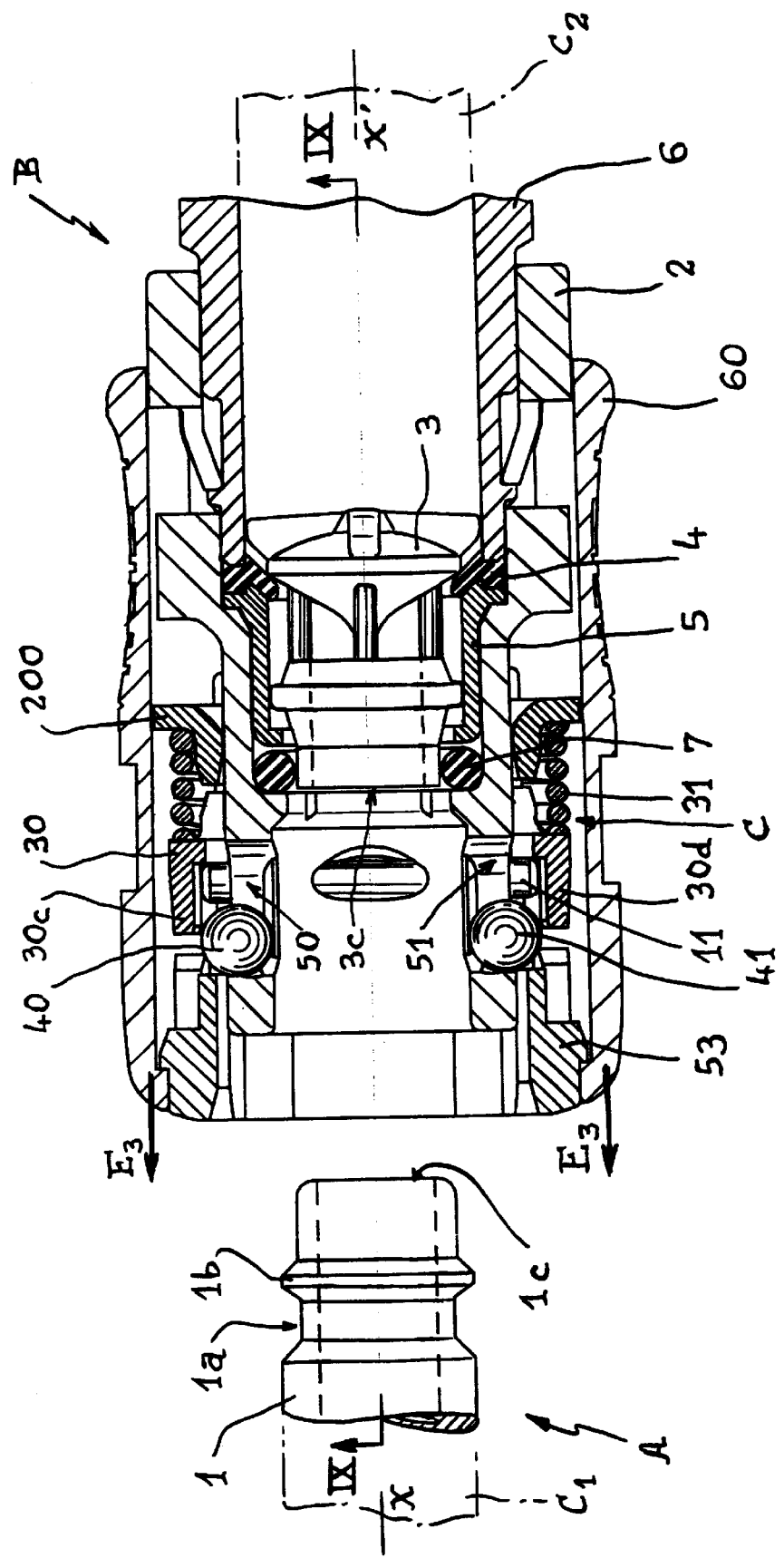
FIG. 10 is a section along line X—X of FIG. 9; IX—IX therein indicates the plane of section of FIG. 9.

When it is desired to continue disconnection of the male and female elements A and B, it suffices to exert on the sleeve 60 an effort $E_3$ as shown in FIGS. 9 and 10, in the direction opposite the effort $E_1$, which has the effect of displacing the ring 53 in the direction of the pipe $C_1$ beyond the opening of the central bore 2a of the body 2. The bearing portions 53a and 53b then no longer oppose the extraction of the balls 40 and 41 outside the groove 1a of the connector 1. When the balls 40 and 41 are extracted from the groove 1a and since the needles 10 and 11 are already upstream of the flange 1b, there is nothing to oppose the extraction of the connector 1 from the body 2, which may in that case be effected as shown in FIGS. 9 and 10.

During introduction of the male element A in the female element B, the inclined front face of the flange 1b pushes the balls 40 and 41 upstream. The balls, captive in their slots 50 and 51, come into abutment in these slots and push the body 2 inside the sleeve 60 held in the operator's hand. The position of FIGS. 9 and 10 is then attained. In this position, the balls 40 and 41 may be driven radially to the outside of the slots 50 and 51 by the flange 1b of the connector 1 in the course of introduction in the bore 2a of the body 2. In effect, the ring 53 and the ring 30 do not overlap at the level of parts 53a, 53b, and 30c. In this way, taking into account the operation of the needles 10 and 11 described with reference to FIGS. 1 to 3, it will be understood that the connection between the male and female elements A and B is automatic, in that it intervenes solely by the movement of introduction of the male connector 1 in the body 2.

Returning to the intermediate positions shown in FIGS. 5 to 8, and corresponding to the discharge of the pipe $C_1$, it will be understood that it is indispensable that the balls 40 and 41 perform their function of retention of the connector 1 inside the body 2 efficiently, until the pipe $C_1$ is completely discharged, in order to avoid any untimely separation of the male part A from the female part B. Such a separation would in effect be the same as denying the feature of double release of the connection in question.

Due to the increase in the pressure P in the chamber C, the effort $E_4$ exerted on the face 30b of the ring 30 in the direction of the pipe $C_1$ increases as the air coming from this pipe discharges.

If the pressure P in the chamber C becomes too high, care must be taken that the effort $E_4$ is not sufficient to push the ring 53 and the sleeve 60 towards the position of FIGS. 9 and 10 in which the balls 40 and 41 may be ejected from the groove 1a, while the operator has not exerted on the sleeve 60 any effort equivalent to the effort $E_3$ represented in FIGS. 9 and 10.

In order to eliminate this danger of untimely opening of the connection, and in accordance with the invention, it is provided to limit the movement of the sleeve 60 and of the ring 53 in the direction of the pipe $C_1$ in the position of FIGS. 5 to 8.

To that end, vents 100 are provided in the body 2, so that the air flowing from the connector in the volume V may follow the path represented by arrow F' in FIG. 7. In this way, a potentially dangerous rise in pressure in chamber C is avoided.

According to an embodiment of the invention (not shown), it may also be provided that the inner surface of the ring 53 presents longitudinal ribs which define channels with the outer surface of the body 2, these channels allowing communication of chamber C and the outside atmosphere. These channels therefore also constitute vents for communication of the inner volume of the sleeve 60 and the outside of the connection.

In any case, the total cross-section of the vents is provided to be sufficient to allow the flow of the fluid issuing from pipe $C_1$ without a substantial rise in the pressure P in the chamber C, with the result that any risk of untimely movement of the ring 53 may be set aside.

Figure 4:
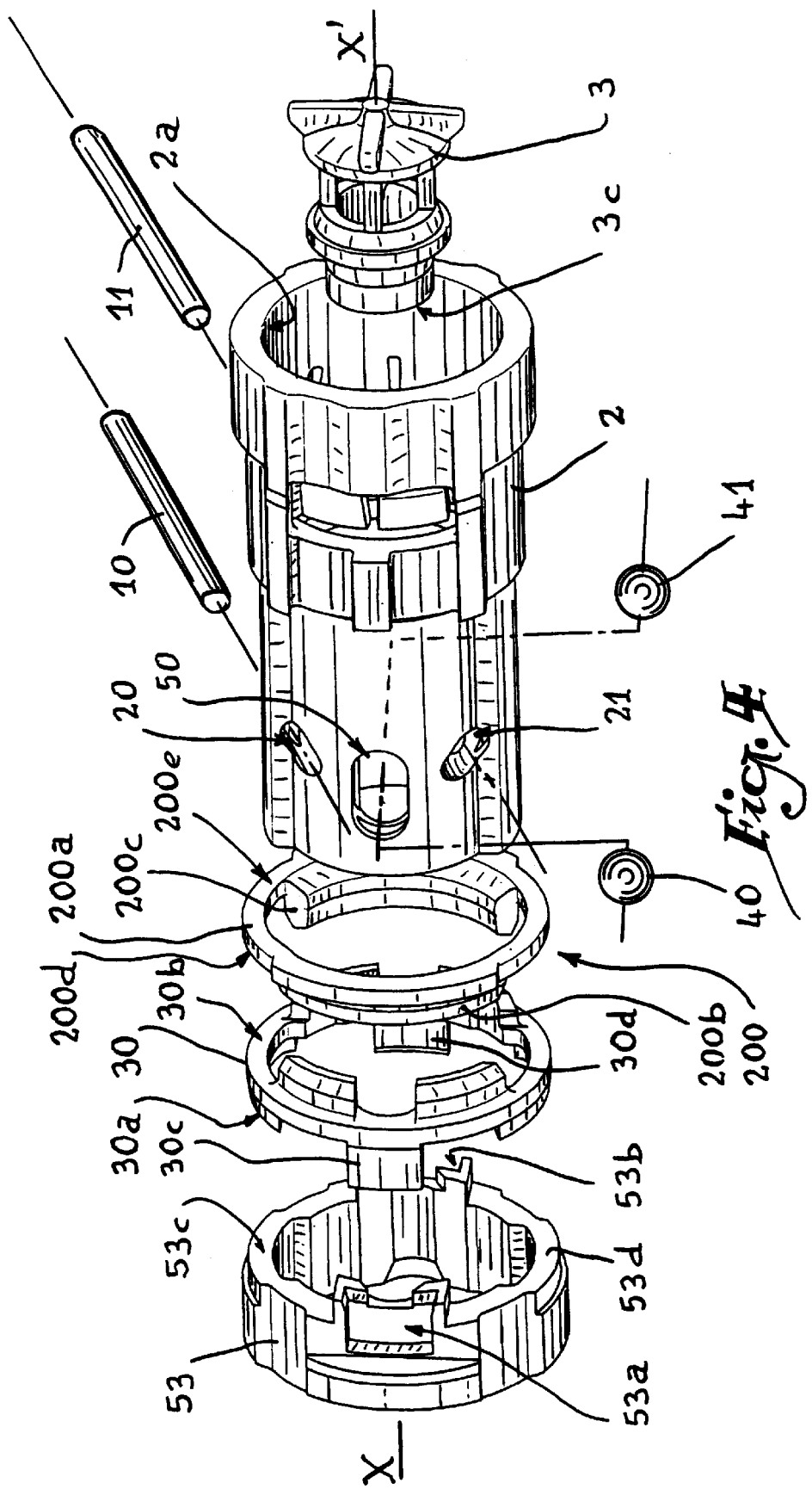
FIG. 4 shows, in an exploded perspective view, certain elements constituting the connection of FIGS. 1 to 3.

Furthermore, a safety ring 200 is housed in the chamber C, i.e. between the body 2 and the sleeve 60, in abutment against a shoulder 2b of the body 2. The ring 200 is more particularly visible in FIG. 4. It comprises an annular portion 200a and two sectors 200b and 200c presenting, in combination with the annular portion 200a, a cross-section in the form of a C as shown in FIGS. 3, 6, 8 and 10. The face 200d of the ring 200 turned towards the pipe $C_1$ is in simple abutment against the spring 31, so that the ring 200 is elastically loaded in the direction of the shoulder 2b of the body 2.

Furthermore, the sleeve 60 bears a plurality of inner heels or tabs 60a of which two are visible in FIGS. 1,5,7 and 9 and which are provided to cooperate with the face 200e of the safety or stop ring 200 turned toward the pipe $C_2$.

In the event of rise in pressure in the chamber C, the effort $E_4$, exerted on the locking ring 30 and which would tend to displace the ring 53 in the direction of the pipe $C_1$, would have the effect of likewise entraining the sleeve 60 which is fast with the ring 53. Such a movement of the sleeve 60 in the direction of the pipe $C_1$ would involve, due to the abutment of the heels 60a on the face 200e of the ring 200, a displacement of this ring against the effort $E_5$ generated by the spring 31 and the pressure prevailing in the chamber C. In other words, the antagonistic efforts $E_4$ and $E_5$ which are respectively exerted on the rings 53 and 200, as shown in FIG. 8, are due to the pressure P and to the spring 31, with the result that they are substantially of the same value, which makes it possible to avoid a lack of equilibrium which might lead to a displacement of the ring 53 and of the sleeve 60. In this way, independently of the value of the pressure P, a situation of stable equilibrium in the configuration of FIGS. 5 and 8 is obtained. The air present in the pipe $C_1$ can therefore escape safely, through the vents 100 or equivalent, without risk of auto-movement of the sleeve 60.

In order to improve the reliability of the connection further, the clearance J between the sleeve 60 and the body 2 downstream of the ring 200 is provided to be greater than the clearance j between the ring 200 and the body 2 and than the clearance j' between the ring 200 and the sleeve 60. The air present in the chamber C may thus flow in the annular space defined by the clearance J, as represented by arrow F" in FIGS. 7 and 8.

Thus, the pressure prevailing downstream of the safety ring 200 is permanently lower than the pressure P prevailing in the chamber C, as long as this pressure is different from atmospheric pressure. This make it possible to make full use of the force due to the pressure P prevailing in the chamber C to load the ring 200 in the direction of the shoulder 2b, without risk of unstable positioning of the ring 200 inside the chamber C, even in a variant embodiment where the spring 31 does not cooperate with the ring 200.

The vents 100, on the one hand, and the safety ring 200, on the other hand, may be provided independently in the connection of the invention or in combination, as shown in the Figures. In other words, the ring 200 might be omitted as long as sufficient vents are provided; similarly, the vents might be eliminated while only one safety ring is provided. The safety ring presents the additional advantage of not being accessible from the outside, with the result that its functioning is never altered. In particular, when the connection operates in a dirty environment, it may be that waste encumbers the vents 100 and even blocks them, which would render them inefficient. The ring 200 functions totally satisfactorily, including in a dirty environment.

It should also be noted that the ring 200 is efficient whatever the pressure P which depends on the pressure of the fluid transiting in the connection, since the effort exerted on the ring 200 to withstand the displacement of the sleeve 60 increases with this pressure.

In fact, the ring 200 constitutes an element for stopping displacement of the sleeve 60 and the ring 5. In the example shown, it is constituted by a ring, but it is obvious that it might also be formed by discrete elements distributed around the body 2 in the inner volume of the sleeve 60.

The invention has been shown with a locking means formed by needles and retention members formed by ball, which allows the female element B to be adapted to the connectors 1 of the male element A of variable geometry. However, other locking means and retention members may be envisaged, in particular claws, possibly mounted on an annular ring. Such claws may, as desired, replace the needles, the balls or both at the same time. The invention is also applicable with retention members formed by articulated levers in the female part and each provided with a nose or beak adapted to penetrate in an outer peripheral groove of the male connector. The geometry of the nose or beak of these levers may be adapted to that of the groove of the connector, hence a considerable adaptability of the female element with respect to the different types of connectors on the market.

The invention has been described with a connection supplied with air. However, it is applicable whatever the fluid, gaseous or liquid, transiting in the pipes.

What is claimed is:

1. A quick safety connection for selectively connecting pipes and fluid communication, the safety connection comprising a male connector and a female element, said male connector being of a size to be selectively received within a central bore of said female element, a sleeve slidably disposed about said female element so as to be axially movable relative thereto between a first position wherein said male connector is fully connected to said female element to an intermediate discharge position as said sleeve is moved toward said female element wherein said male connector is partially spaced from but connected to said female element, means for limiting movement of said sleeve at said intermediate discharge position, said means for limiting including an annular space defined between a portion of said female element and said sleeve, a stop disposed within said annular space and being engageable by tab means carried by said sleeve when said sleeve is moved in a direction toward said female element, at least one fluid path in said female element to permit fluid entry into said annular space when said sleeve is moved from said first position to said intermediate discharge position wherein fluid is permitted to be discharged from between said male connector and said female element to a surrounding atmosphere and such that a fluid pressure is created within said annular space to provide a force to urge said stop against said tab means of said sleeve to thereby oppose movement of said sleeve toward said male connector to thereby retain said sleeve in said intermediate position and prevent the release of said male connector from said female element until pressure between said male connector and said female element is reduced to a safe level to permit said male connector to be fully disconnected from said female element by subsequent movement of said sleeve toward said male connector, locking means movably disposed between said male connector and said female element for retaining said male connector in said first position, and retention means for releaseably retaining said male connector to said female element when said sleeve is moved to said intermediate discharge position.

2. The quick safety connection of claim 1, wherein said means for limiting the movement of said sleeve includes venting orifices in said female element allowing a flow of fluid from the annular space towards the surrounding atmosphere.

3. The quick safety connection of claim 2, wherein said venting orifices have a total cross-section area allowing the flow of the fluid from said central bore without substantial rise of pressure in the annular space.

4. The quick safety connection of claim 1, wherein said stop is formed by a first ring disposed around said female element.

5. The quick safety connection of claim 4, including means for resiliently urging said first ring in a direction of an outer bearing surface of said female element and in a direction of said tab means.

6. The quick safety connection of claim 5, wherein the means for resiliently urging said first ring applies a force to urge said locking means to retain said male connector in said first position.

7. The quick safety connection of claim 4 including an element secured to said sleeve encircling said female element in said annular space and spaced from said stop, said element being acted on by the fluid pressure within said annular space when said sleeve is in said intermediate discharge position to thereby apply a force against said sleeve which is opposite to the force applied against said stop by the fluid pressure within said annular space and force applied by a resilient element mounted within said annular space thereby creating equilibrium of forces in opposing directions to said sleeve when said sleeve is in said intermediate discharge position.

8. The quick safety connection of claim 1, wherein a clearance between said female element and said sleeve, downstream of said tab means in the direction of a flow of the fluid toward said male connector in said intermediate discharge position, is greater than a clearance between said tab means and said female element and a clearance between said tab means and said sleeve.

9. The quick safety connection of claim 1, wherein said retention means is formed by at least one ball movable in an axial and radial direction in an oblong slot formed in said female element parallel to a direction of introduction and extraction of said male connector in and from said female element.

10. The quick safety connection of claim 1, wherein said locking means includes needles mobile in oblong slots formed in said female element in directions inclined with respect to a direction of introduction and extraction of said male connector in and from said female element.

11. The quick safety connector of claim 1 including a resilient element mounted within said annular space for applying a force, together with the force of the fluid pressure within said annular space, toward said stop to retain said sleeve in said intermediate discharge position.

* * * * *